RADIO FREQUENCY TRANSMISSION NETWORK
Filed July 21, 1947
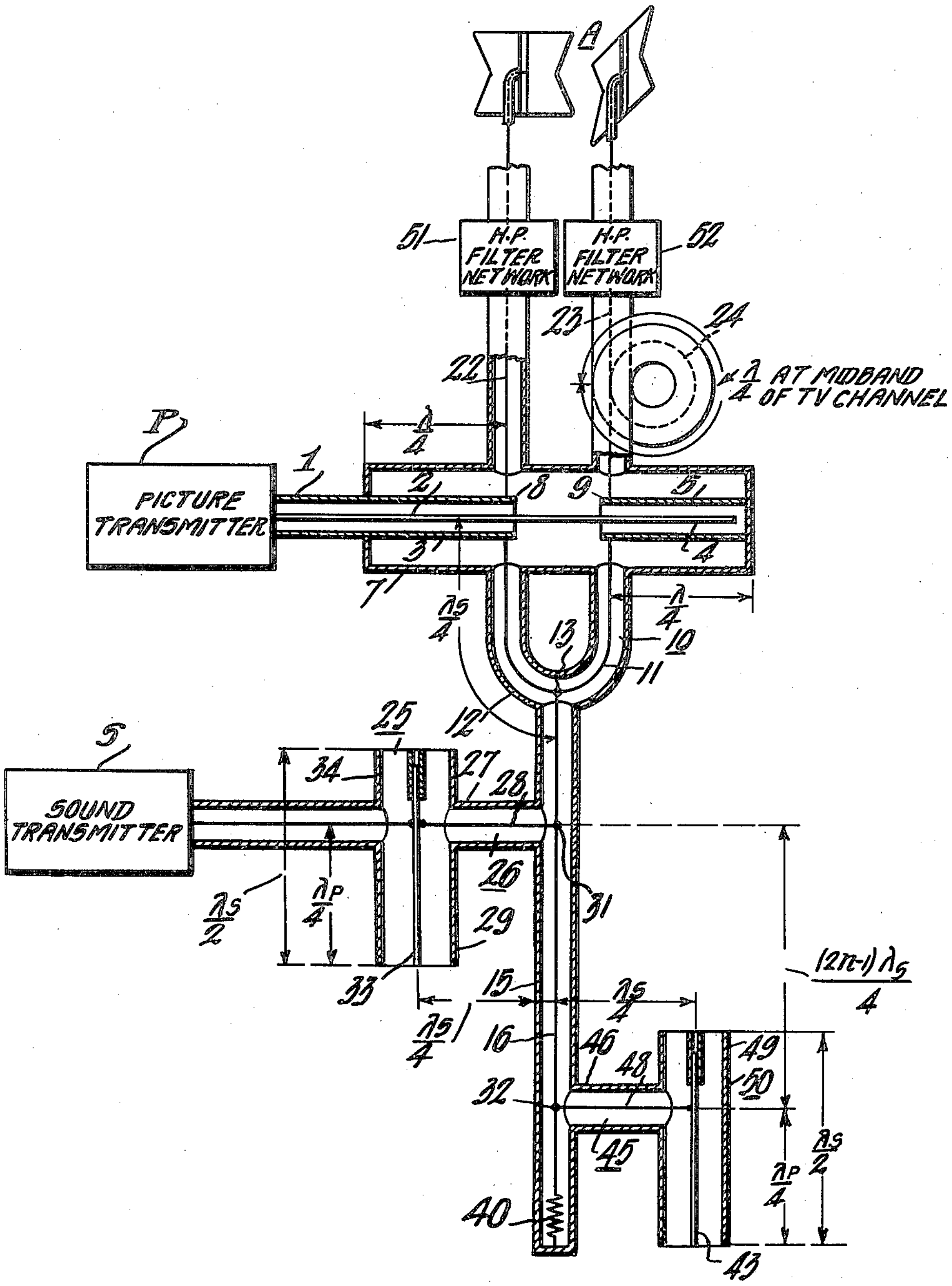
INVENTOR.
Robert W. Masters
BY Harry Tunick
ATTORNEY Patented Jan. 24, 1950

2,495,589

UNITED STATES PATENT OFFICE 2,495,589

RADIO FREQUENCY TRANSMISSION NETWORK

Robert W. Masters, Erlton, N. J., assignor to Radio Corporation of America, a corporation of Delaware Application July 21, 1947, Serial No. 762,479

8 Claims. (Cl. 178—44)

The present invention relates to radio frequency transmission networks and more particularly to diplexing arrangements whereby a plurality of radio frequency carriers may be fed to a single load circuit or antenna.

An object of the present invention is the improvement of diplexing arrangements.

Another object of the present invention is to provide a low cost simplified television antenna system.

Another object of the present invention is to provide a television transmission line system which eliminates the necessity of expensive and complicated vestigial sideband filters as heretofore used.

Still a further object of the present invention is to provide a practical wide band absorbing system for purpose of dissipating unwanted sidebands, of a carrier frequency, and energy of unwanted lower sidebands reflected from a combined antenna and high pass filter.

To understand the improved system of the present invention, it will be necessary to briefly review a system as now commonly used.

In the present system, amplification is done in the transmitter on a double sideband basis, wherein sidebands on both sides of carrier are amplified equally. Before the television signals go on the air, it is necessary to filter out all components of frequency less than 1.25 megacycles below carrier frequency. The filter must have a crossover network provided for shunting off and absorbing the energy in these unwanted sidebands while at the same time presenting an excellent impedance match to the main transmission line at all frequencies. Such filters at present are located at the output of the picture transmitter, and act to modify the signals in such a way as to make them conform to accepted standards of the art, before they enter the diplexing network and thence proceed to the antenna. Means are provided in the filter for absorbing the very considerable power in the unwanted sidebands.

In the system according to the present invention the sideband filter is removed from the picture signal transmission line entirely and the picture carrier and both sidebands are piped into the diplex unit whereby both picture and sound signals are coupled to a common antenna. The operation of the diplex unit and the reflected picture signal absorbing network is similar to that described in my prior application, Serial No. 714,620, filed December 6, 1946, but due to the rearrangement of the elements thereof, a broader band effect is obtained.

The present invention contemplates the additional use of the absorbing network for reflected picture signals for dissipating the unwanted sidebands. Thus, a single absorbing network, in addition to balancing the power drawn by the two halves of a turnstile antenna and removing echoes due to mismatch at the antenna, also disposes of the unwanted sidebands of the picture signals. The absorbing network is so adjusted as not to affect the sound signals, but to be broad band enough to absorb all picture signals coming down through the diplex network as reflected from high pass filter networks between the diplex network and the antenna as well as any signals returning from the antenna. The filter networks in the transmission lines are exactly alike.

The present invention will be more fully understood by reference to the following detailed description which is accompanied by a drawing in which there is illustrated in the single figure in schematic form an embodiment of the present invention.

Referring now to the figure, the general operation of the system will first be described. There is shown a picture transmitter P from which a picture modulated carrier wave is carried by coaxial transmission line 1 to the diplexing arrangement. The coaxial transmission line has an inner conductor 2 and an outer conductor 3. At the end of transmission line 1 remote from the picture transmitter P, the outer conductor 3 of the transmission line is surrounded by an outer sleeve 7. In an end-to-end coaxial relationship with the outer conductor 3 of line 1 is a section of a conductive tubing 5, coaxially surrounding an extension 4 of inner conductor 2 of transmission line 1. The outer sleeve 7 is of such length as to enclose the end of outer conductor 3 and tubular conductor 5 each for a distance approximating a quarter wavelength. At its ends sleeve 7 is connected to conductors 3 and 5 respectively.

The action of coaxial conductors 2, 3 and 4, 5 is such as to transform the electrical system from an unbalanced to a balanced-to-ground method of transmission. At points 8 and 9 at the adjacent ends of conductors 3 and 5 the voltages are balanced to ground; that is, at a given instance the voltage on one will be positive while the other is negative but of equal amplitude.

To points 8 and 9 is connected a half wave loop of coaxial transmission line 10. The coaxial line 10 has an outer casing 12 connected at each end to outer sleeve 7 while the ends of the inner conductor 11 are connected to points 8 and 9 of conductors 3 and 5. Since loop 10 is a half wave, $$\frac{\lambda S}{2}$$

long at the sound carrier frequency it has only a very small effect as a shunt reactance upon the impedance presented to the picture line 1 of the diplexing unit. This is true since sound and picture frequencies are close together. The reactance looping into loop at points 8 and 9 is nearly infinite. However, since the point 13 at the center of the loop is effectively at ground potential with regard to the picture carrier frequency but is not physically connected to ground, it is possible to feed in a sound modulated carrier wave at this point from the sound transmitter S through coaxial transmission line 15 having an inner conductor 16 and an outer conductor 17. Since both sides of the loop 10 are of equal length the energy from sound signal transmitter S arrives at points 8 and 9 in an in-phase relationship. That is, at any given instant, when point 8 is positive, point 9 is likewise positive. Hence, no energy can couple to the picture signal transmitter P because there is no voltage across transmission line 1 to drive it in that direction. While I have shown a particular type of diplex unit which is satisfactory, it should be clearly understood that my invention is not limited thereto. Actually, any circuit which can be reduced in its operating fundamentals to a type of Wheatstone bridge arrangement may equally well be used.

Energy at points 8 and 9 from both the picture and sound signal transmitter flows out the lines 22 and 23 through high pass filter networks 51 and 52 and proceeds to what are in effect isolated, dissipative loads for each signal. The filters 51 and 52 are designed so that they begin to reject frequencies starting at .75 megacycle per second below picture carrier frequency and reject, to a predetermined level, all frequencies below 1.25 megacycles per second below carrier frequency. At all frequencies above the critical cut-off point, the filters transmit energy and present a good match to the line. The respective outer conductors surrounding lines 22 and 23 to make these lines coaxial transmission lines are not shown nor are the phasing networks for feeding the opposite halves of each radiator in phase opposition. In the present arrangement the loads are represented by a turnstile television antenna A. While I have shown antenna A as being a broad band radiator, a simple crossed rod turnstile arrangement may be used if desired. Line 23 contains a quarter wave phasing loop 24 along its length whereby line 23 is electrically a quarter wave longer than transmission line 22. Thus the phase rotation of the radiated picture signal is in the opposite direction to that of the sound signal. The signals are therefore independently radiated and do not interact with one another.

Now, since the lower sidebands are not transmitted to the antenna through the filters 51, 52, they are reflected back to the diplex unit. The reflected waves arriving at points 8 and 9 of the diplexing system, are now in phase instead of out of phase since line 23 has caused a 180 degree phase lag from the two trips through the phasing loop 24. The returning reflected lower sideband cannot enter the picture signal line 1 because the energy in lines 22 and 23 is in an in-phase relationship but it can proceed toward the sound transmitter S along transmission line 15.

At point 31 the transmission line 15 in effect branches into a side line and a main line, the side branch 26, including outer conductor 27 and inner conductor 28. This line eventually leads to a second transmitter S. At a distance equal to one quarter of the sound carrier wavelength $\lambda s$ from point 31 is connected a cross branch 34 including outer shell 29 and an adjustable length inner conductor 33. The T sections are tuned such that they reflect a short circuit at points 31 and 32 at wavelength $\lambda s$, and open circuits at the same points at wavelength $\lambda_P$, allowing no intermediate critical frequencies. The filter formed by the cross branch 34 passes sound signals between transmitter S and line 15 without interference while acting so as to reject the picture carrier. Thus, at point 31 picture signals are required to pass on along line 15 finally arriving at terminating resistor 40 when they are dissipated.

At a distance equal to a quarter of the sound carrier wavelength from point 31 at point 32 is placed a second notch filter including a T formation of transmission lines 45 and 50. Line 45 has an inner conductor 48 and outer shell 46 while line 50 has an outer shell 49 and an adjustable length inner conductor 43. The line length and points of connection in this second filter correspond to those of filter arrangement 25. Due to the presence of this second filter at a distance of a quarter wavelength from point 31 energy from sound transmitter S cannot proceed along line 15 toward terminating resistor 40.

At a near picture carrier wavelengths the notch filters 25 and 50 are very close to short circuited so that at points 31 and 32 they appear as open circuits allowing all of the rejected sidebands and antenna echoes to proceed to resistor 40 and then be absorbed.

It should be noted that the sound transmitter is well protected from rejected picture signals since filter 25 is a near short circuit for all wavelengths except that of the sound carrier and odd multiples thereof.

Where I have referred to line lengths as being a unitary fractional part of a wavelength, it should be understood that odd multiples thereof may be used if desired.

Any portion of the lower sideband not absorbed in the resistor 40 and which may be reflected go back to the filters 51 and 52 and reflect again. This time they go back to the picture transmitter P since they are now, due to their successive passages through phasing loop 24, in a phase opposing relationship at points 8 and 9. At the picture transmitter, they are reflected back to the diplex unit, thence to the filters and back to the absorbing resistor 40 for a second absorption. In short, the unwanted signals never get to the antenna. They bounce around down below, and finally, after successive absorption, each of which take a high percentage of the unwanted wave, the lower sideband is reduced to a very low level.

The above described invention combines the power equalizing and echo absorbing properties of network 25 as described in my prior application, Serial No. 714,620, filed December 6, 1946, together with the necessary absorption of the lower sidebands all into a single network, and results a network simplification of a complicated system.

While I have illustrated a particular embodiment of the present invention, it should be clearly understood that it is not limited thereto since many modifications may be made in the several elements employed and in their arrangement and it is therefore contemplated by the appended claims to cover any such modifications as fall within the spirit and scope of the invention.

What is claimed is:

1. In a radio frequency transmission network including a plurality of sources of high frequency waves, individual transmission lines from each of said sources to a common junction point, output transmission lines from said junction point to an antenna, filter circuits in each of said output transmission lines adapted to block the passage of sidebands to one side of the frequency of one of said sources and means in the transmission line from the other of said sources effective to absorb energy appearing therein from the said one of said sources.

2. In a radio frequency transmission network including a plurality of sources of high frequency waves, individual transmission lines from each of said sources to a common junction, means at said junction point for combining said waves into a pair of output transmission lines, the energy from one of said source being applied to said output transmission lines in a push pull relationship and from the other of said sources in a push push relationship, one of said output lines having a quarter wave loop therein whereby energy from both of said sources is applied to a load in a phase quadrature relationship, each of said lines having therein a high pass filter network adjusted to cut off the sidebands to one side of the frequency of one of said sources, and means in the transmission line from the other of said sources effective to absorb energy appearing therein from said one of said sources.

3. In a radio frequency transmission network including a plurality of sources of high frequency waves, individual transmission lines from each of said sources to a common junction point, means at said junction point for combining said waves into a pair of output transmission lines, the energy from one of said sources being applied to said output transmission lines in a push pull relationship and from the other of said sources in a push push relationship, one of said output lines having a quarter wave loop therein whereby energy from both of said sources is applied to a load in a phase quadrature relationship, each of said lines having therein a high pass filter network so adjusted as to cut off the side bands to one side of the frequency of one of said sources, the transmission line from the other of said sources containing an absorbing network effective to absorb energy appearing therein from said one of said sources but ineffective as to energy from the source to which said transmission line is connected.

4. A radio frequency transmission network including a plurality of sources of high frequency waves, individual transmission lines from each of said sources to a common junction point, means at said junction point for combining said waves into a pair of output transmission lines, the energy from one of said sources being applied to said output transmission lines in a push pull relationship and from the other of said sources in a push push relationship, one of said output lines having a quarter wave loop therein whereby energy from both of said sources is applied to a load in a phase quadrature relationship, each of said output lines having therein a high pass filter network so adjusted as to cut off the side bands to one side of the frequency of one of said sources, the transmission line from the other of said sources containing means effective to absorb enerby appearing therein from said one of said sources but ineffective as to energy from the source to which said transmission line is connected, said means including a pair of T-shaped branch transmission lines each having its foot connected to said transmission line for the other of said sources, the point of connection of said branches being spaced a distance equal to a quarter of the operating wavelength of said other source, an energy dissipating resistor connected across the end of said last mentioned transmission line and the other of said sources being connected to the top of said T-shaped branch which is nearer said junction joint.

5. A radio frequency transmission network including a plurality of sources of high frequency waves, individual transmission lines from each of said sources to a common junction point, means at said junction point for combining said waves into a pair of output transmission lines, the energy from one of said sources being applied to said output transmission lines in a push pull relationship and from the other of said sources in a push push relationship, one of said output lines having a q uarter wave loop therein whereby energy from both of said sources is applied to a load in a phase quadrature relationship, each of said output lines having therein a high pass filter network so adjusted as to cut off the side bands to one side of the frequency of one of said sources, the transmission line from the other of said sources containing means effective to absorb energy appearing therein from said one of said sources but ineffective as to energy from the source to which said transmission line is connected, said means including a pair of T-shaped branch transmission lines each having its foot connected to said transmission line for the other of said sources, the points of connection of said branches being spaced a distance equal to a quarter of the operating wavelength of said other source, an absorber of high frequency energy connected across the end of said last mentioned transmission line and the other of said sources being connected to the top of said T-shaped branches which is nearer said junction point, the height of each of said T-shaped branches being equal to one quarter of the wavelength of said other source and the length of one arm of each of said branches being equal to one-quarter of the wavelength of said one source.

6. A radio frequency transmission network including a plurality of sources of high frequency waves, individual transmission lines from each of said sources to a common junction point, means at said junction point for combining said waves into a pair of output transmission lines, the energy from one of said sources being applied to said output transmission lines in a push pull relationship and from the other of said sources in a push push relationship, one of said output lines having a quarter wave loop therein whereby energy from both of said sources is applied to an antenna in a phase quadrature relationship, each of said lines having therein a high pass filter network so adjusted as to cut off the side bands to one side of the frequency of one of said sources, the transmission line from the other of said sources containing an absorbing network effective to absorb energy appearing therein from said one of said sources but ineffective as to energy from the source to which said transmission line is connected.

7. A radio frequency transmission network including a plurality of sources of high frequency waves, individual transmission lines from each of said sources to a common junction point, means at said junction point for combining said waves into a pair of output transmission lines, the energy from one of said sources being applied to said output transmission lines in a push pull relationship and from the other of said sources in a push push relationship, means in one of said output lines to alter the phase of energy in said line whereby energy from both of said sources is applied to a load in a phase quadrature relationship, each of said lines having therein a high pass filter network so adjusted as to cut off the side bands to one side of the frequency of one of said sources, the transmission line from the other of said sources containing means effective to absorb energy appearing therein from said one of said sources but ineffective as to energy from the source to which said transmission line is connected, said means including a pair of T-shaped branch transmission lines each having its foot connected to said transmission line for the other of said sources, the points of connection of said branches being spaced a distance equal to a quarter of the operating wavelength of said other source, an energy dissipating resistor connected across the end of said last mentioned transmission line and the other of said sources being connected to the top of said T-shaped branch which is nearer said junction point.

8. A radio frequency transmission network including a plurality of sources of high frequency waves, individual transmission lines from each of said sources to a common junction point, means at said junction point for combining said waves into a pair of output transmission lines, the energy from one of said sources being applied to said output transmission lines in a push pull relationship and from the other of said sources in a push push relationship, means in one of said output lines to alter the phase of energy in said lines whereby energy from both of said sources is applied to a load in a phase quadrature relationship, each of said lines having therein a high pass filter network so adjusted as to cut off the side bands to one side of the frequency of one of said sources, the transmission line from the other of said sources containing means to absorb energy appearing therein from said one of said sources but ineffective as to energy from the source to which said transmission line is connected, said means including a pair of T-shaped branch transmission lines each having its foot connected to said transmission line for the other of said sources, the points of connection of said branches being spaced a distance equal to a quarter of the operating wavelength of said other source, an absorber of high frequency energy connected across the end of said last mentioned transmission line and the other of said sources being connected to the top of said T-shaped branches which is nearer said junction point, the height of each of said T-shaped branches being equal to one quarter of the wavelength of said other source and the length of one arm of said branches being equal to one-quarter of the wavelength of said one source.

ROBERT W. MASTERS.

REFERENCES CITED

The following references are of record in the file of this patent:

UNITED STATES PATENTS

| Number | Name | Date |
|---|---|---|
| 2,214,041 | Brown | Sept. 10, 1940 |
| 2,341,408 | Lindenblad | Feb. 8, 1944 |